July 7, 1925.  
P. LOGAN  
MOTOR SLED  
Filed Sept. 11, 1924
1,545,264
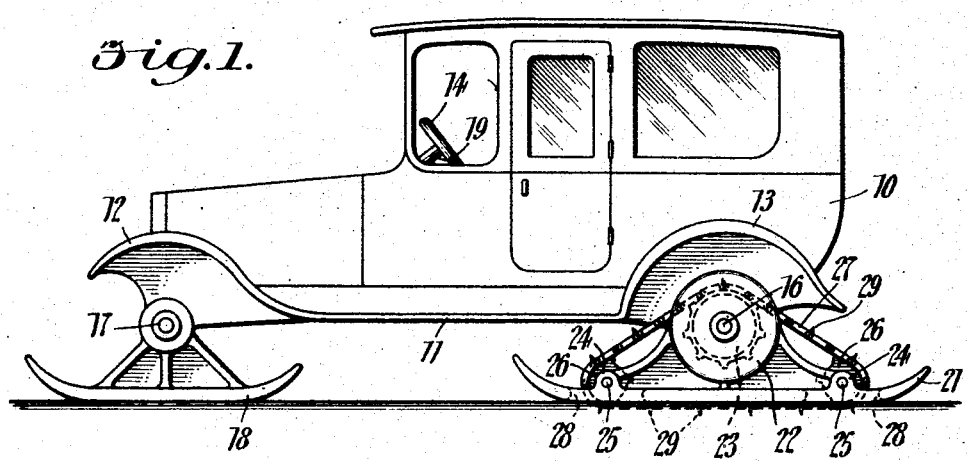
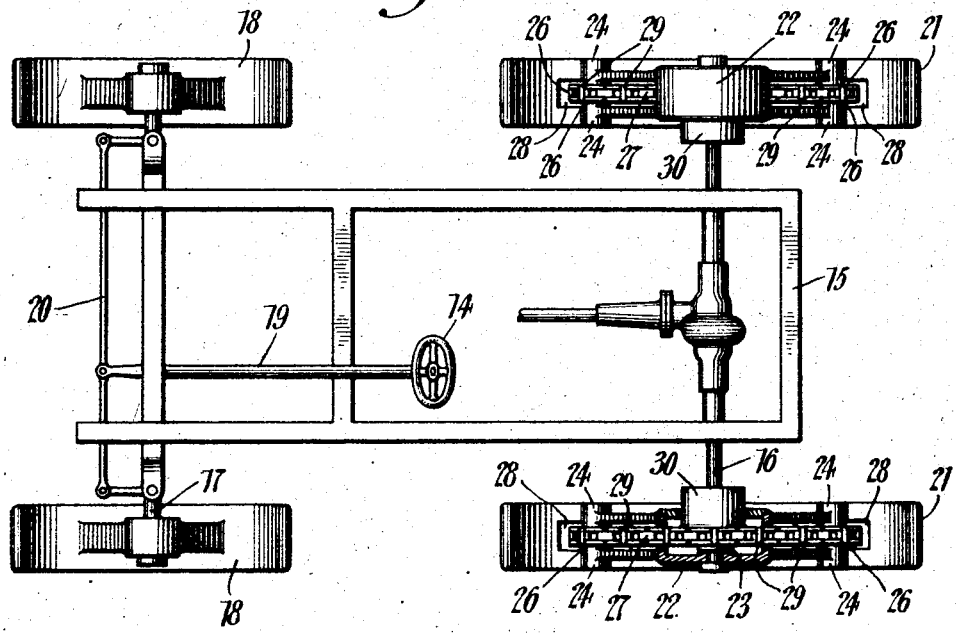
Inventor  
Peter Logan  
By his Attorney Patented July 7, 1925.

1,545,264

UNITED STATES PATENT OFFICE.

PETER LOGAN, OF CALUMET CITY, ILLINOIS.

MOTOR SLED.

Application filed September 11, 1924. Serial No. 737,044.

*To all whom it may concern:*

Be it known that I, PETER LOGAN, a citizen of the United States, residing at Calumet City, in the county of Cook and State of Illinois, have invented certain new and useful Improvements in Motor Sleds, of which the following is a specification.

The present invention relates to improvements in motor sleds, and it is the principal object of the invention to provide a motor vehicle with runners attached to the front and rear axles of the vehicle to replace the customary wheels, and to provide means for propelling the rear axle and its runners for swiftly moving the vehicle across a snowy or icy road surface.

Another object of the invention is the provision of a pair of sleigh runners adapted to be attached to the rear axle of a motor vehicle, which have longitudinal slots allowing the passage of a drive chain guided over a sprocket wheel on the motor driven rear axle and equipped with road engaging prongs.

A further object of the invention is the provision of a pair of runners carrying a housing in which a sprocket wheel on the rear axle of the vehicle is located, and which carries two guide sprocket wheels while a chain is guided over the sprocket wheels equipped with road engaging prongs passing through slots in the housing to firmly engage the road and propel the vehicle under the action of its motor.

It is also an object of the present invention to provide the front axle of a motor vehicle with runners replacing the wheels and allowing a steering of the vehicle in a convenient manner by the steering wheel while a braking of the propulsion chain on the rear is effected by a customary brake drum.

These and other objects and advantages of my invention will become more fully known as the description thereof proceeds, and will then be specifically pointed out in the appended claim.

In the accompanying drawing, forming a material part of this disclosure:—

Figure 1 is a side elevation of an automobile equipped with sleigh runners constructed in accordance with the present invention.

Figure 2 is a top plan view of an automobile frame equipped with sleigh runners constructed according to the invention.

In the drawing, 10 designates a chassis or automobile body equipped with the customary foot-board 11, front mud guards 12, rear mud guards 13 and steering wheel 14.

The chassis is supported by the customary frame 15 carrying the rear axle 16 and front axle 17.

The front wheels on axle 17 are replaced by the runners 18, and the steering is effected by means of the steering wheel 14, post 19 and movable steering frame 20, in the usual manner.

The rear wheels are replaced by a pair of sleigh runners generally designated 21 comprising casings 22 in which sprocket wheels 23 are located, keyed to the rear drive shaft to receive power from the motor in the well known manner used to drive the rear wheels of a motor car. The runners 21 are provided with upstanding ears 24 in which the shafts 25 of sprocket or chain wheels 26 are journalled. A drive chain 27 is guided over part of sprocket wheel 23 and of sprocket wheels 26 and forms a caterpillar traction tread underneath the sleigh runners 21 which allow the passage of the chain through elongated openings 28 in their bodies. The chain is equipped with a plurality of snow and ice engaging prongs 29 suitably spaced apart on said chain to move the automobile forward by their successive engagement with the road during the rotation of sprocket wheel 23.

A suitable brake drum 30 is provided to brake the caterpillar traction chain on the downward grade on steep hills.

It will be clear that while the sleigh runners are here shown as an example attached to a passenger car, they may also be attached to any other motor vehicle as for instance motor trucks or the like with such changes as fall within the scope of the appended claims without departing from the spirit of the present invention.

Having thus described my invention, what I claim as new and desire to secure by Letters Patent, is:—

The combination with a motor vehicle having a rear axle, of runners pivotally attached to said axle, each of said runners being composed of a symmetrical casting presenting a flat level lower surface having upwardly curved ends, and containing an open elongated slot, raised transverse lugs on the upper surface, spaced side plates on the runners extending between the lugs, a circular casing supported on said plates centrally of the runner, all of said elements being of integral construction, a sprocket gear fixed on the axle to rotate within the casing, sprocket pinions mounted intermediate each lug, a chain trained over said gear and pinions, and spurs carried by alternate links of said chain, said chain and spurs projecting through the mentioned slot in said runner.

In witness whereof I have affixed my signature.

PETER LOGAN.